United States Patent
Huller et al.

(10) Patent No.: US 6,785,605 B2
(45) Date of Patent: Aug. 31, 2004

(54) METHOD AND ARRANGEMENT FOR PERFORMING AN EXHAUST GAS ANALYSIS ON MOTOR VEHICLES HAVING AN ON-BOARD ENGINE CONTROL AND DIAGNOSTIC SYSTEM

(75) Inventors: Dieter Huller, Ettlingen (DE); Michael Ludwig, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/367,697

(22) Filed: Feb. 19, 2003

(65) Prior Publication Data

US 2003/0182994 A1 Oct. 2, 2003

Related U.S. Application Data

(63) Continuation of application No. PCT/DE01/03129, filed on Aug. 16, 2001.

(30) Foreign Application Priority Data

Aug. 16, 2000 (DE) .......................................... 100 39 965

(51) Int. Cl.[7] .................................................. F01N 11/00
(52) U.S. Cl. ........................... 701/114; 701/109; 701/29
(58) Field of Search ................................. 701/114, 115, 701/110, 108, 109, 29, 33, 35; 73/117.3, 118.2

(56) References Cited

U.S. PATENT DOCUMENTS

| | | | |
|---|---|---|---|
| 5,550,740 A | | 8/1996 | Hall et al. |
| 5,839,534 A | | 11/1998 | Chakraborty et al. |
| 5,941,918 A | * | 8/1999 | Blosser ........................ 701/29 |
| 6,032,088 A | | 2/2000 | Feldmann et al. |
| 6,148,656 A | * | 11/2000 | Breton ...................... 73/118.1 |
| 6,334,357 B2 | * | 1/2002 | Moine et al. .............. 73/117.3 |
| 6,382,014 B1 | * | 5/2002 | Breton ...................... 73/118.1 |
| 6,604,033 B1 | * | 8/2003 | Banet et al. .................. 701/33 |
| 6,631,611 B2 | * | 10/2003 | Shi et al. .................... 701/109 |

FOREIGN PATENT DOCUMENTS

| | | |
|---|---|---|
| DE | 42 30 796 A1 | 3/1994 |
| DE | 43 38 917 C2 | 5/1994 |
| DE | 195 45 169 A1 | 6/1997 |
| DE | 196 07 461 A1 | 9/1997 |
| DE | 198 21 136 A1 | 3/1999 |
| DE | 197 52 965 A1 | 6/1999 |
| DE | 198 26 179 A1 | 5/2000 |
| DE | 198 50 990 A1 | 5/2000 |
| EP | 0 816 820 A2 | 1/1998 |
| WO | WO 00/23694 A2 | 4/2000 |

* cited by examiner

*Primary Examiner*—Hieu T. Vo
(74) *Attorney, Agent, or Firm*—Sughrue Mion, PLLC

(57) ABSTRACT

An exhaust gas analysis is to be performed, in a manner that is largely automatic, on motor vehicles having an on-board engine control and diagnostic system (OBD 2) and equipped with a diagnostic interface (3). To this end, control commands (15) are generated, preferably in an exhaust gas tester (12), and are transmitted via the diagnostic interface (3) to the engine control and diagnostic system (2). The engine control and diagnostic system (2), in accordance with the control commands (15), adjusts the operating states of the motor vehicle (1) that are prescribed for the exhaust gas analysis.

18 Claims, 1 Drawing Sheet

METHOD AND ARRANGEMENT FOR PERFORMING AN EXHAUST GAS ANALYSIS ON MOTOR VEHICLES HAVING AN ON-BOARD ENGINE CONTROL AND DIAGNOSTIC SYSTEM

This is a Continuation of International Application PCT/DE01/03129, with an international filing date of Aug. 16, 2001, which was published under PCT Article 21(2) in German, and the disclosure of which is incorporated into this application by reference.

FIELD OF AND BACKGROUND OF THE INVENTION

Due to legal regulations, motor vehicles must be subjected to emissions inspections at regular intervals. The emissions test is performed according to a fixed procedure using an exhaust emissions tester, whereby the motor vehicle has to be brought into predetermined operating states for the various individual analysis steps, and be kept in these states for the duration of the respective analysis steps. The predetermined operating states are set by the test personnel in accordance with instructions provided by an analysis procedure, which is typically displayed on a monitor. For example, a predetermined engine speed is set by pressing the accelerator pedal, or the required disturbance variable for the lambda control is applied or removed by pulling off or plugging in an air hose. Predetermined data, including the exhaust gas values, of the motor vehicle being tested are stored and printed out in the form of a test certificate.

Due to legal requirements, enacted, in particular, to reduce the emissions of motor vehicles, the USA since 1996 and the European Union beginning in 2000 have required new cars to be equipped with on-board diagnostic (OBD) systems. These OBD systems, either as a component of the on-board engine control or in combination therewith, detect essential operating variables of the motor vehicle as well as its emissions values using suitable sensors, and detect malfunctions of the motor vehicle by comparing these variables with predetermined recommended variables. In addition to displaying the malfunctions on-board the motor vehicle, the information needed for identifying and repairing these malfunctions must be made available via a diagnostic interface.

Equipping motor vehicles with on-board diagnostic systems will affect the emissions test at least in that current and/or stored emissions-related motor vehicle data will be read out from the diagnostic systems during the emissions test and recorded together with additional emissions test data in the course of the emissions test. This means that the exhaust gas tester must be connected to the diagnostic interface of the on-board diagnostic system.

OBJECTS OF THE INVENTION

One object of the present invention is therefore to facilitate a largely automatic execution of the emissions test for motor vehicles having on-board diagnostic systems.

SUMMARY OF THE INVENTION

According to one formulation of the invention, this and other objects are achieved by a method of emissions testing for a motor vehicle that has an on-board engine control and diagnostic system and a diagnostic interface. The method includes: performing the emissions test using an emissions tester, executing a program external to the on-board engine control and diagnostic system to control the emissions test, wherein the program generates control commands during the execution, and transmitting the control commands via the diagnostic interface to the on-board engine control and diagnostic system, which sets operating states of the motor vehicle, which are predetermined for the emissions test, as a function of the control commands.

According to another formulation, the invention is directed to an emissions test apparatus for a motor vehicle having an on-board engine control and diagnostic system and a diagnostic interface. The apparatus includes a unit that is arranged outside the engine control and diagnostic system and that generates control commands and transmits the control commands via the diagnostic interface to the engine control and diagnostic system. The control commands are configured to control the engine control and diagnostic system to set operating states of the motor vehicle predetermined for the emissions test.

The present invention is based, inter alia, on the consideration that, in addition to the prescribed standardized, i.e., manufacturer-independent, diagnostic information, manufacturer-specific information may also be read out and/or control commands may be transmitted to the engine control via the diagnostic interface. Accordingly, according to the present invention, control commands are generated externally of the engine control and diagnostic system of the motor vehicle, preferably in an exhaust gas tester or in a controller connected thereto, and transmitted via the diagnostic interface to the engine control arrangement. This provides a particularly advantageous way to automatically set the respective predetermined operating states of the motor vehicle for the exhaust gas test. The control commands are preferably generated by executing a program located in the emissions tester. The program execution preferably contains information about the prescribed procedure of the emissions test as well as manufacturer-specific information about the engine control of the relevant motor vehicle.

Preferably, the system automatically registers the operating states through which the motor vehicle passes during the emissions test, while at the same time registering the emissions values themselves.

In order to ensure that the emissions test proceeds in an orderly manner, the emissions test and/or individual analysis steps of the emissions test are advantageously initiated upon reaching various given operating states. Preferably, it is detected that the various operating states to be set have been reached on the basis of the data obtained from the motor vehicle during the emissions test. At least a part of this data may be read out from the engine control and diagnostic system via the diagnostic interface. In addition, it is possible to register selected data from the motor vehicle in other ways. For example, the engine speed may be registered via the AC voltage part of the vehicle system voltage of the motor vehicle or with the aid of vibration, noise, or magnetic sensors attached in the vicinity of the engine.

By way of example, a predetermined operating state of the motor vehicle to be set in the course of the emissions test may be defined by a predetermined engine speed at a predetermined operating temperature. The operating temperature may be obtained in this case by way of the coolant temperature, information on which may be retrieved via the diagnostic interface. The engine speed may be set directly using a control command transmitted to the engine control, as is performed, for example, within the engine control upon setting a fixed traveling speed for the motor vehicle (cruise control). However, it is also possible to influence the engine speed via an appropriate control command to change the throttle-valve position. In order to be able to set the various individual operating states of the motor vehicle in a defined way, data characteristic for the operating states, for example the engine speed, may be obtained from the motor vehicle. The control commands generated by the system can then be adaptively changed as a function of this data, for example by changing the throttle-valve setting to adjust the current operating state to the desired, i.e. set-point, operating state. Here as well, the data may be read out via the diagnostic interface or registered in some other way from the motor vehicle.

BRIEF DESCRIPTION OF THE DRAWINGS

In the following, reference is made to the preferred embodiments shown in the drawing, for further explaining the present invention, its features and its advantages.

DETAILED DESCRIPTION OF THE PREFERRED EMBODIMENTS

Figure 1:
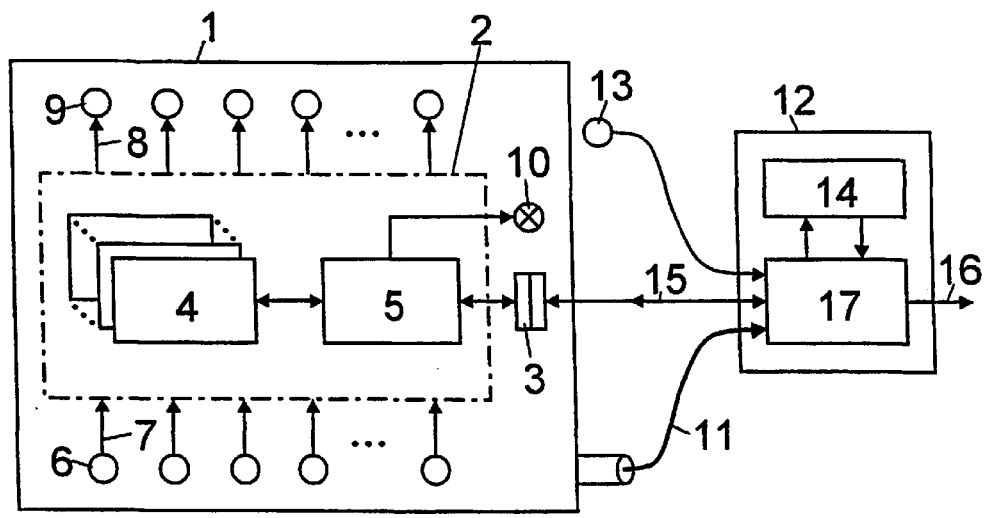
FIG. 1 shows a first exemplary embodiment of the arrangement according to the present invention.

FIG. 1 shows a motor vehicle 1, which has an on-board engine control and diagnostic system 2 having a diagnostic interface 3, in the form of a simplified block diagram. The engine control and diagnostic system 2 contains one or more engine control functions 4 and a diagnostic unit 5, which exchange data with one another and are connected to the diagnostic interface 3. A plurality of sensors 6 provide data 7 specific to the current operating state to the engine control and diagnostic system 2, which in turn transmits control signals 8 to actuators 9, to control the engine and other systems of the motor vehicle 1. The diagnostic unit 5 evaluates significant operating variables of the motor vehicle 1, of which some operating variables allow conclusions about the emissions behavior to be drawn. The diagnostic unit 5 also indicates a malfunction of the motor vehicle 1 whenever limiting values are exceeded, by means of a lamp 10 in the motor vehicle 1. In addition, the diagnostic unit 5 provides information, such as error codes, via the diagnostic interface 3, upon request, for identifying and repairing the malfunction of the motor vehicle 1.

During the emissions test, the exhaust gases of the motor vehicle 1 are supplied via a sampling line 11 to an exhaust gas tester 12 and analyzed therein. The emissions test is performed within a test and control unit 17 as a function of data from the motor vehicle 1 that are read out from the engine control and diagnostic system 2 via the diagnostic interface 3. Alternatively or in addition, the data may be registered using a suitable sensor 13 in the motor vehicle 1, as here, for example, the engine speed. The emissions test procedure is controlled by a program, which is executed in a computer device 14 and which contains information about the analysis steps through which the emissions test passes as well as manufacturer-specific information about the engine control of the motor vehicle 1. Specific control commands 15 are generated as a function of the respective analysis steps through which the program passes. These control commands are then transmitted from the test and control unit 17 via the diagnostic interface 3 to the engine control and diagnostic system 2, for the purpose of setting predetermined operating states of the motor vehicle 1. Data provided by the engine control and diagnostic system 2 and/or received from the sensor 13 signals that the various respective operating states have been reached, whereupon, respectively, the corresponding test steps of the emissions analysis are performed. The exhaust gas values obtained hereby are output in a test report 16 together with other data received from the motor vehicle 1.

Figure 2:
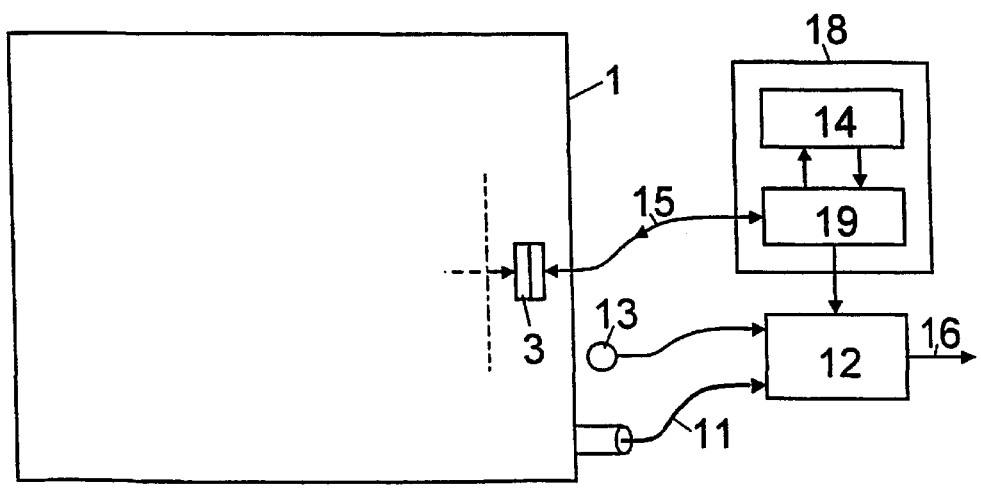
FIG. 2 shows a further exemplary embodiment.

In a second embodiment of an arrangement according to the present invention, shown in FIG. 2, the control commands 15 for setting predetermined operating states of the motor vehicle 1 are generated in a controller 18, for example a diagnostic device, which also controls the exhaust gas tester 12. For this purpose, the controller 18 contains, in addition to a diagnostic and control unit 19 connected to the diagnostic interface 3 of the motor vehicle 1, a computer unit 14, in which a program that controls the execution of the emissions test is run. When a given operating state of the motor vehicle 1 prescribed for a specific test step is reached in response to a control command 15, the exhaust gas tester 12 is activated to perform the exhaust gas analysis for that particular test step.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. System for performing an emissions analysis of a motor vehicle, comprising:

an on-board engine control and diagnostic system provided in the motor vehicle;

an emissions testing station provided external to the motor vehicle; and an electronic interface between said on-board engine control and diagnostic system and said emissions testing station;

wherein said emissions testing station comprises a program that generates a plurality of control commands that are relayed to said on-board engine control and diagnostic system via said interface and cause said on-board engine control and diagnostic system to place the motor vehicle in a plurality of mutually distinct operating states.

2. System according to claim 1, wherein said on-board engine control and diagnostic system generates a plurality of information signals, indicative of the operating states of the motor vehicle, that are relayed to said emissions testing station via said interface.

3. An emissions test apparatus for a motor vehicle having an on-board engine control and diagnostic system and a diagnostic interface, said apparatus comprising:

a unit, arranged outside the engine control and diagnostic system, that generates control commands and transmits the control commands via the diagnostic interface to the engine control and diagnostic system, wherein the control commands are configured to control the engine control and diagnostic system to set operating states of the motor vehicle predetermined for the emissions test.

4. The apparatus according to claim 3, wherein said unit is integrated into an emissions tester.

5. The apparatus according to claim 4, wherein said emissions tester comprises an output unit to output data regarding the operating states of the motor vehicle set during the emissions test.

6. The apparatus according to claim 5, wherein said output unit outputs additional data regarding registered emissions test values.

7. The apparatus according to claim 3, wherein said unit is integrated into a controller which controls an emissions tester external to the controller.

8. A method of emissions testing for a motor vehicle that has an on-board engine control and diagnostic system and a diagnostic interface, comprising:

performing the emissions test using an emissions tester, executing a program external to the on-board engine control and diagnostic system to control the emissions test, wherein the program generates control commands during the execution, and transmitting the control commands via the diagnostic interface to the on-board engine control and diagnostic system, which sets operating states of the motor vehicle, which are predetermined for the emissions test, as a function of the control commands.

9. The method according to claim 8, wherein the program is executed within the emissions tester.

10. The method according to claim 8, wherein the program is executed in a controller that controls the emissions tester.

11. The method according to claim 8, further comprising:

automatically documenting the operating states of the motor vehicle which are set during the exhaust gas test.

12. The method according to claim 11, further comprising:

registering exhaust gas values concurrently with said documenting.

13. The method according to claim 8, further comprising:

registering data of the operating states of the motor vehicle, wherein at least one step of the emissions test is triggered by detecting one of the operating states from the registered data.

14. The method according to claim 15, further comprising:

reading out at least a part of the data from the engine control and diagnostic system via the diagnostic interface.

15. The method according to claim 8, wherein commencement of the emissions test is triggered by detecting one of the operating states from the registered data.

16. The method according to claim 8, further comprising:

registering respective data characteristic for plural ones of the operating states of the motor vehicle, wherein the generated control commands adaptively change as a function of the registered data.

17. The method according to claim 16, wherein the control commands adaptively change to bring a current operating state of the vehicle to a predetermined set-point operating state of the vehicle.

18. The method according to claim 16, further comprising:

reading out at least a part of the data from the engine control and diagnostic system via the diagnostic interface.

* * * * *